3,336,359
DICYANOACETYLENE SYNTHESIS
Peter D. Zavitsanos, Norristown, Pa., assignor to General Electric Company, a corporation of New York
Filed Dec. 18, 1964, Ser. No. 419,427
3 Claims. (Cl. 260—465.8)

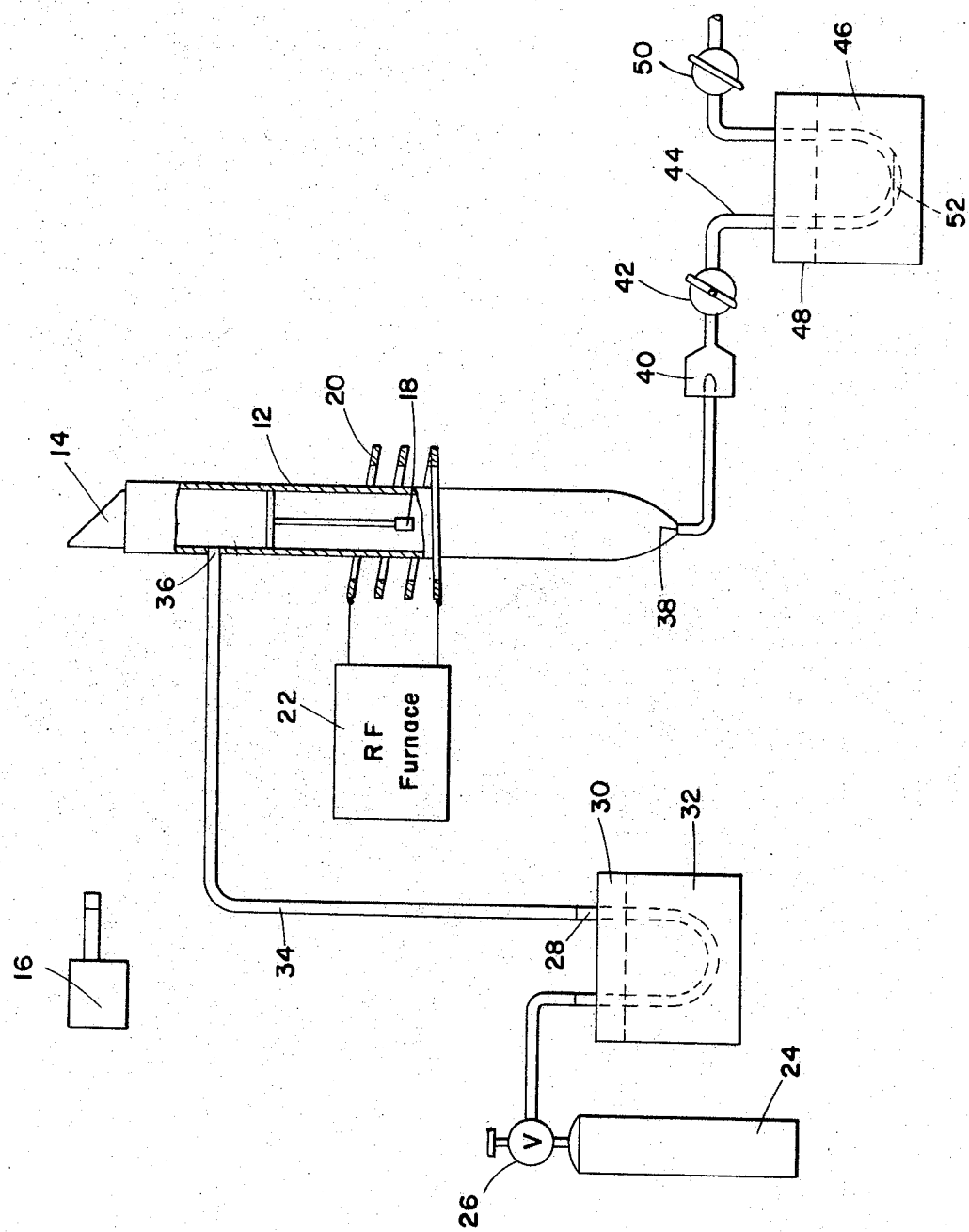

ABSTRACT OF THE DISCLOSURE

Dicyanoacetylene is formed by direct combination of gaseous nitrogen with carbon heated to 2376 to about 3,000 degrees K., uncombined nitrogen and reaction products flowing away to a cooler region where products may be separated by condensation.

---

This invention pertains to the art of organic chemistry and specifically to a way of preparing dicyanoacetylene, $C_4N_2$.

Dicyanoacetylene was first prepared by C. Maureau in 1909, as reported in Bull. Soc. Chim. (V), p. 846. His process involved several steps. First, he replaced the hydrogen in each carboxyl group of acetylene dicarboxylic acid with a methyl group derived from methyl alcohol. By treatment with ammonium hydroxide each methyl group and an adjacent oxygen were replaced by an amino group. The hydrogens of the amino group and the surviving oxygen of the original carboxyl were then condensed out over phosphorus pentoxide, leaving a triple bonded nitrogen and carbon in place of the original carboxyl group. Although this compound has been known for over fifty years, the tedious nature of the canonical process for producing it has apparently discouraged detailed exploration of its properties, although Benes, Peska, and Wichterle have reported (page 562 of Chemistry and Industry for Mar. 24, 1962) that dicyanoacetylene forms a solid black polymer when brought into contact with oxygen. The high energy of formation (which may readily be understood by consideration of the three triple bonds in the molecule) leads to the directly useful property that dicyanoacetylene when burned with oxygen produces flame temperatures of the order of 5500 degrees centigrade. This last property in a material which is liquid at room temperature and at atmospheric pressure is enough to justify interest in its production (although the structure strongly suggests that it will serve also as a useful intermediate in a number of syntheses).

Briefly, I have found a process for forming dicyanoacetylene and obtaining a useful yield of it by direct combination of nitrogen and carbon. This is done by bringing the nitrogen gas in contact with the carbon when the latter is heated to a very high temperature.

Thus an important object of my invention is the production of dicyanoacetylene by direct combination of its constituent elements. Other objects of my invention are to produce dicyanoacetylene rapidly, by a process involving only a few steps, and from very inexpensive and readily available starting materials.

For the better explanation and understanding of my invention, I have provided a figure of drawings in which:

The figure represents a train of apparatus suitable for producing dicyanoacetylene in accordance with my invention.

The reaction chamber actually employed in the first demonstration of my invention was a fused silica tube two inches in diameter, here represented by designation 12. At its top it is surmounted by a totally reflecting prism 14 at which there is aimed an optical pyrometer 16, the total arrangement permitting the optical pyrometer to view the brightness of sample 18. Sample 18 (to be discussed in more detail hereinafter) lies in the field of inductor 20 (here represented as edgewise wound copper strip, sectioned at a plane through its central axis) which is the output coil of a radio frequency furnace or induction heater 22 of the kind used for many years in outgassing radio tubes during manufacture. A source of nitrogen 24 (represented as a conventional compressed gas cylinder) is represented connected through a conventional diaphragm reducing valve 26 to a U-tube 28, whose lower part is immersed in a beaker 30 which is partly filled with a solution 32 of carbon dioxide in acetone. In actual practice, beaker 30 will be surounded by some thermal insulation such as glass wool or simple cotton batting; or a Dewar flask may replace the beaker 30. The function of the first U-tube 28 is simply to refrigerate incoming nitrogen to insure the removal of most of the water or hydrocarbon vapor present in the commercial gas. It is particularly desirable to minimize the hydrogen concentration in the apparatus because hydrogen will readily enter into combination with the reactive materials present, producing undesired side products. The nitrogen thus purified passes through a tube 34 to a port 36 at the top of tube 12, flowing downward past sample 18 to an exit 38 at the bottom of tube 12. Exit 38 is connected to a ground glass joint 40 which leads to a stopcock 42 of a U-tube 44 whose lower part is immersed in a solution 46 of carbon dioxide in acetone, contained in a beaker (or Dewar flask) 48. The exit from the U-tube runs through a stopcock 50. The product of the synthesis, as will be explained further in detail, appears as condensate 52 at the bottom of the U-tube 44.

In the preferred operation of the apparatus described, regulator 26 is so adjusted as to produce a flow of purified nitrogen at a linear velocity of about 15 centimeters per second past sample 18, which may conveniently be a cylinder of graphite about ⅔ inch in diameter and ½ inch high. The radio frequency furnace 22 is adjusted to heat the sample 18 to a temperature of about 3,000 degrees Kelvin. The condensate 52 appears at the bottom of U-tube 44. In my original demonstration of this process, I analyzed this product in the mass spectrometer (which was connected to the U-tube 44 through stopcock 50). Typical results obtained were as follows:

| Compound: | Relative intensity |
|---|---|
| $C_4N_2$ | 100 |
| $C_2N_2$ | 19.4 |
| $C_6N_2$ | 1.93 |

Since cyanogen is a gas at room temperature, while dicyanoacetylene is a liquid, simply raising the temperature of the condensate 52 will cause the cyanogen content to be reduced by evaporation.

The production rate of dicyanoacetylene has been found to vary with temperature as follows:

| Temperature of sample in degrees K.: | Product rate in milligrams/hour cm.² |
|---|---|
| 2673 | 1.5 |
| 2773 | 5.0 |
| 2873 | 10 |
| 2973 | 30 |

The area involved in the rate is the nominal superficial area of spectroscopically pure graphite. So-called pyrolytic graphite shows a somewhat lower yield than the figures given above, probably because it is less porous and has less effective surface.

While I have not established rigorously the theoretical basis underlying my invention (since this would presumably be a task requiring the services of several men for some years), I have come to several tentative beliefs which I here offer rather as suggestions which I personally accept than as unqualified statements of fact. The direct synthesis of dicyanoacetylene should, according to the presently accepted structural formula

be highly endothermic and thus occur appreciably only at high temperatures. On the other hand, a six-atom molecule with three triple bonds can hardly be expected to be stable at very high temperatures. I believe that my invention is operative because the nitrogen flows fast enough past the hot carbon so that a molecule of the product, once formed at or near the solid carbon, has a fair probability of being swept off in the much cooler gas stream. Thus one would expect a static or very slowly flowing nitrogen stream to produce very little or none of the desired product. Any deleterious results of increasing the speed of gas flow will be small for speeds considerably greater than my preferred speed. Since the function of gas speed is primarily to remove the products from the hot zone, an increase in the temperature employed may require somewhat greater speed in order to take account of the fact that the high temperature zone around the hot carbon will extend a little farther away from the carbon, and consequently the products must move a little farther from the carbon to achieve a given degree of stability.

The subparagraph form of the appended claims is purely for ease in reading, and does not indicate any relative imporance or necessary relation of the recitals therein.

What is claimed is:

1. The method of making dicyanoacetylene which comprises the steps of
   (1) Providing a surface of carbon heated to a temperature from at least 2673 to about 3000 degrees Kelvin;
   (2) Passing a stream of gas consisting essentially of nitrogen substantially free of hydrogen over the said surface of carbon at a linear speed of at least 15 centimeters per second, thereby producing in the said stream reaction products of the said nitrogen and the said carbon;
   (3) Cooling the said stream of nitrogen and reaction products to condense out dicyanoacetylene.

2. The method of making dicyanoacetylene which comprises the steps of
   (1) Bringing gaseous nitrogen in contact with heated carbon at a temperature from at least 2673 to about 3000 degrees Kelvin to form reaction products;
   (2) Removing the said reaction products and unreacted nitrogen rapidly to an environment cooler than the said heated carbon;
   (3) Separating dicyanoacetylene from the said unreacted nitrogen.

3. The method of making dicyanoacetylene which comprises the steps of
   (1) Bringing gaseous nitrogen in contact with heated carbon to a temperature from at least 2673 to about 3000 degrees Kelvin to form reaction products;
   (2) Cooling the said reaction products and unreacted nitrogen;
   (3) Separating dicyanoacetylene from the said unreacted nitrogen.

No references cited.

CHARLES B. PARKER, *Primary Examiner.*

JOSEPH P. BRUST, *Examiner.*